Oct. 23, 1956  D. I. HAYES  2,768,006
COUPLING MECHANISM FOR COUPLING SELF-LOADING
TRANSPORT TO POWERED VEHICLE
Filed July 13, 1953  6 Sheets-Sheet 4
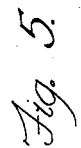
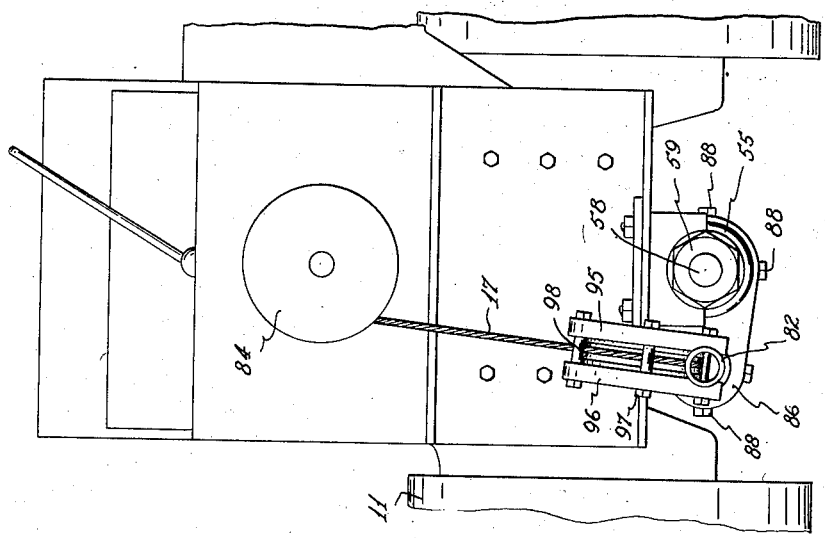
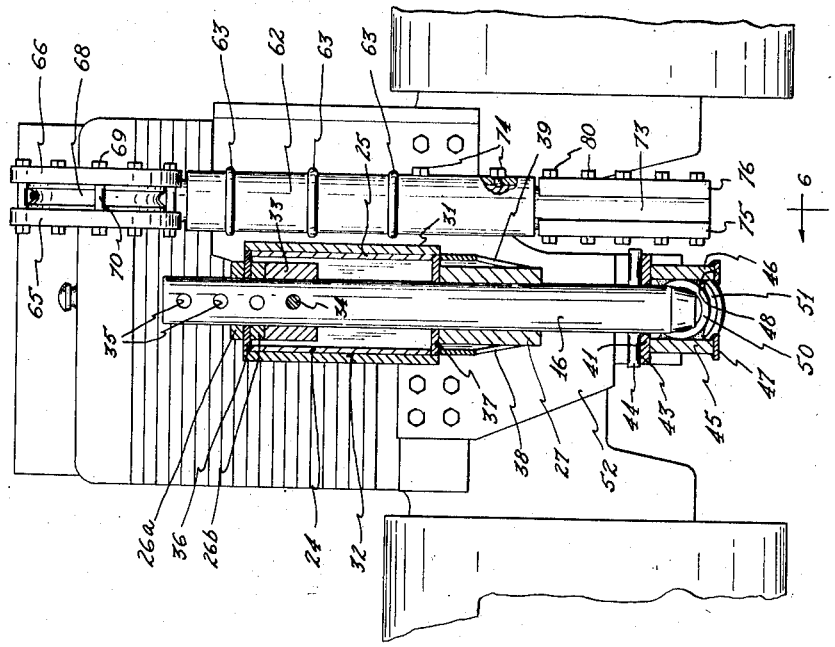
INVENTOR.
Dale I. Hayes
BY
Atty.

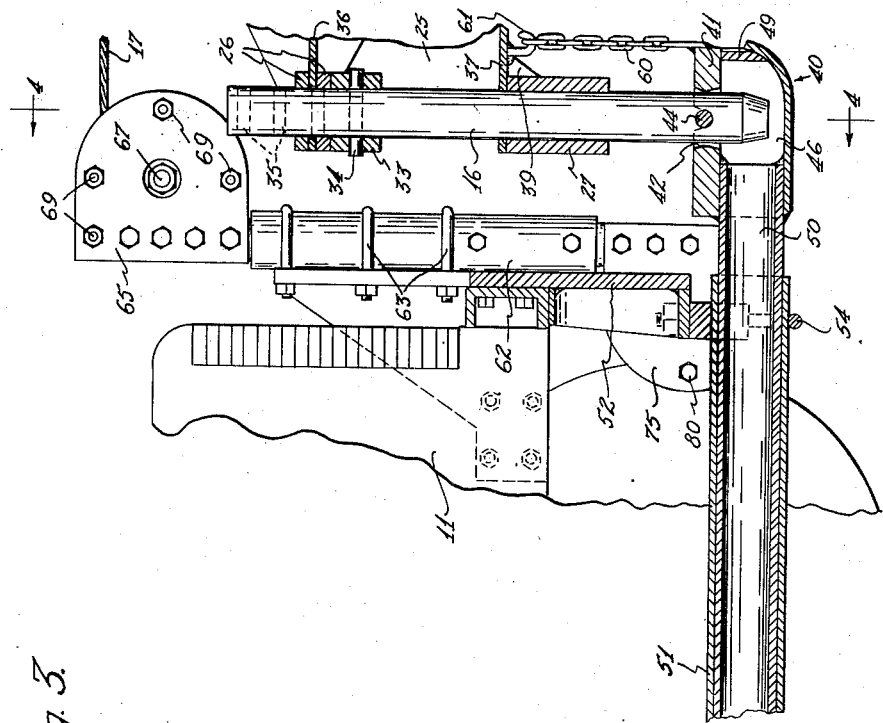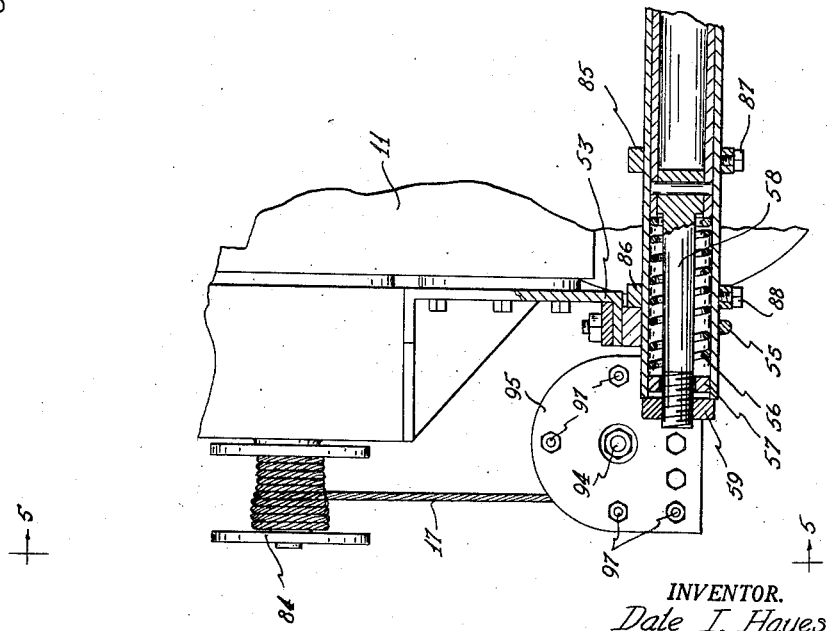
Fig. 3
INVENTOR.
Dale I. Hayes

Oct. 23, 1956  D. I. HAYES  2,768,006
COUPLING MECHANISM FOR COUPLING SELF-LOADING
TRANSPORT TO POWERED VEHICLE
Filed July 13, 1953  6 Sheets-Sheet 5
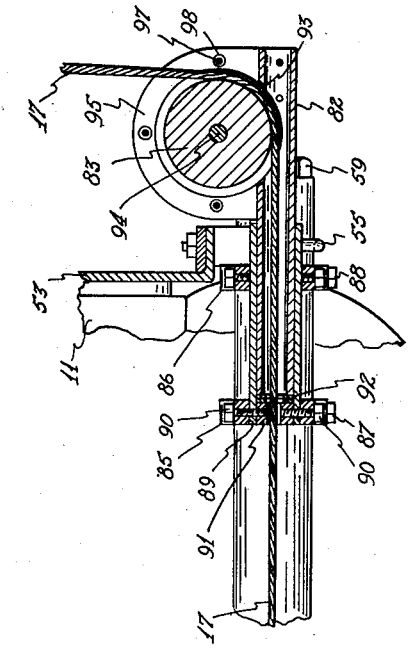
Fig. 6.
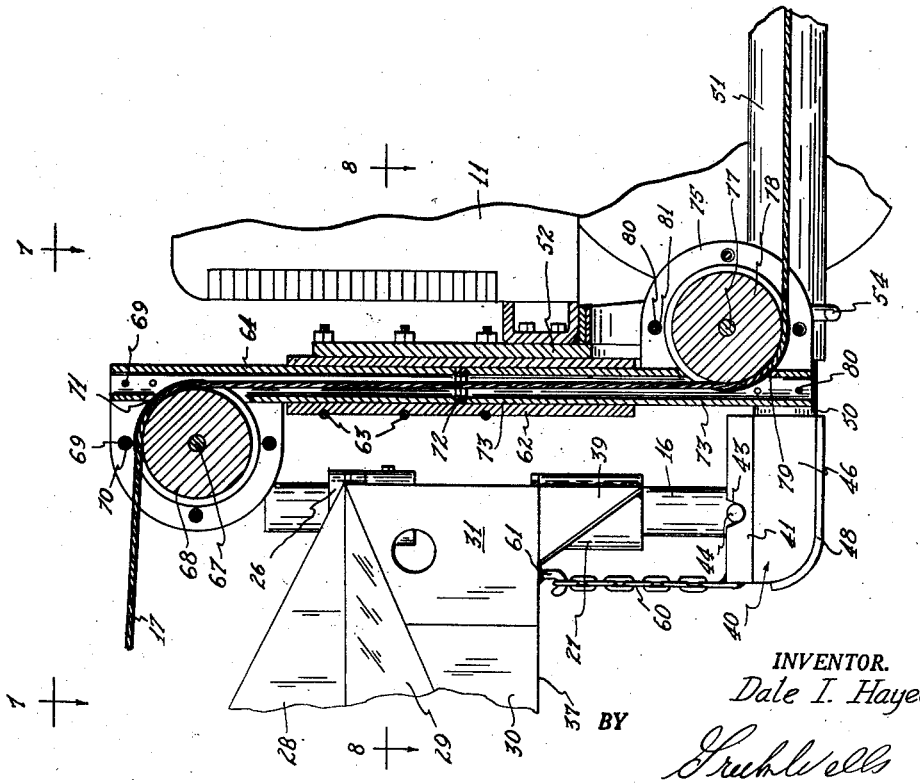
INVENTOR.
Dale I. Hayes
BY
Atty.

Oct. 23, 1956 D. I. HAYES 2,768,006
COUPLING MECHANISM FOR COUPLING SELF-LOADING
TRANSPORT TO POWERED VEHICLE
Filed July 13, 1953 6 Sheets-Sheet 6

INVENTOR.
Dale I. Hayes
BY
Atty.

United States Patent Office 2,768,006
Patented Oct. 23, 1956

2,768,006

COUPLING MECHANISM FOR COUPLING SELF-LOADING TRANSPORT TO POWERED VEHICLE

Dale I. Hayes, Spokane, Wash., assignor to American Zinc, Lead & Smelting Company, St. Louis, Mo., a corporation of Maine Application July 13, 1953, Serial No. 367,445

8 Claims. (Cl. 280—481)

My invention relates to a coupling mechanism which is adapted to connect a powered vehicle such as a crawler type tractor to a work performing vehicle such as the self-loading transport shown in my prior Patent No. 2,518,471. The device shown in my prior patent is utilized in picking up and transporting loose earthen aggregate in such places as under ground mines, various tunnels and deep cuts where it is necessary to remove the earth, rocks, ore, etc. from the working face of the excavation and carry it away to some near by disposal point.

It is the principal purpose of my invention to provide a coupling mechanism whereby the self-loading transport is operatively connected to a powered vehicle so that an operator on the powered vehicle can move the transport forward and back and turn it in any desired direction, and control the loading of the transport through an operating cable that is carried by the coupling mechanism. The construction of the coupling mechanism is such that tipping, due to variations in the level of the terrain over which the vehicle and transport travel, is accommodated in the coupling mechanism. The mechanism provides for keeping the control cable clear in the various movements of the transport. The connections between the powered vehicle and the self-loading transport are such as to provide support for the coupled end of the transport at different levels.

More specifically it is the purpose of my invention to provide a coupling mechanism for coupling a self-loading transport such as that shown in my prior patent mentioned above, to a powered vehicle which embodies a draw-bar unit mounted on the vehicle for limited endwise movement and for rotation in a plane transverse to the longitudinal axis of the vehicle, a coupling pin supported on the draw-bar for rocking movement forward and back and a support on the pin pivotally mounting the rear end of the transport for turning movement about the axis of the pin.

It is a further purpose of the invention to provide in combination with the draw-bar and coupling pin mechanism a cable directing and guiding means by which a cable can be led from the transport to the powered vehicle and operated by a winch on the powered vehicle.

The nature and advantages of my invention will appear more fully from the following description and the accompanying drawings wherein a preferred form of the invention is illustrated. It should be understood however, that the drawings and description are illustrative only and are not intended to limit the invention except insofar as it is limited by the claims.

In the drawings:

Figures 1 and 2 taken together illustrate the self-loading transport and powered vehicle connected together by my improved coupling mechanism;

Figure 3 is an enlarged sectional view taken longitudinally through the coupling mechanism;

Figure 4 is a sectional view taken on the line 4—4 of Figure 3;

Figure 5 is an end view looking at Figure 3 as indicated by the sectional line 5—5 on Figure 3;

Figure 6 is a sectional view taken on the line 6—6 of Figure 4;

Figure 1:
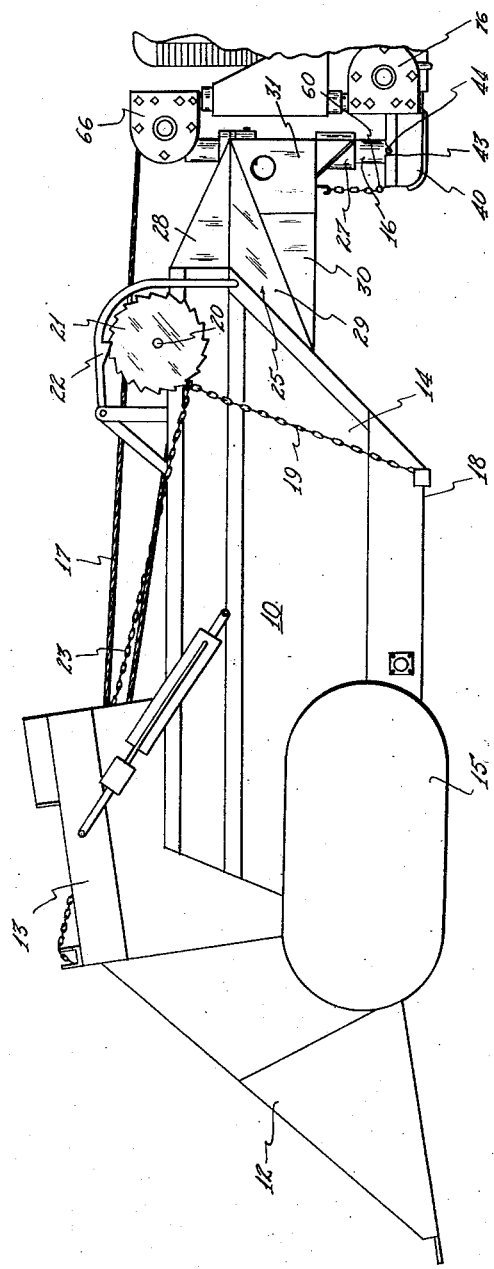
Figure 2:
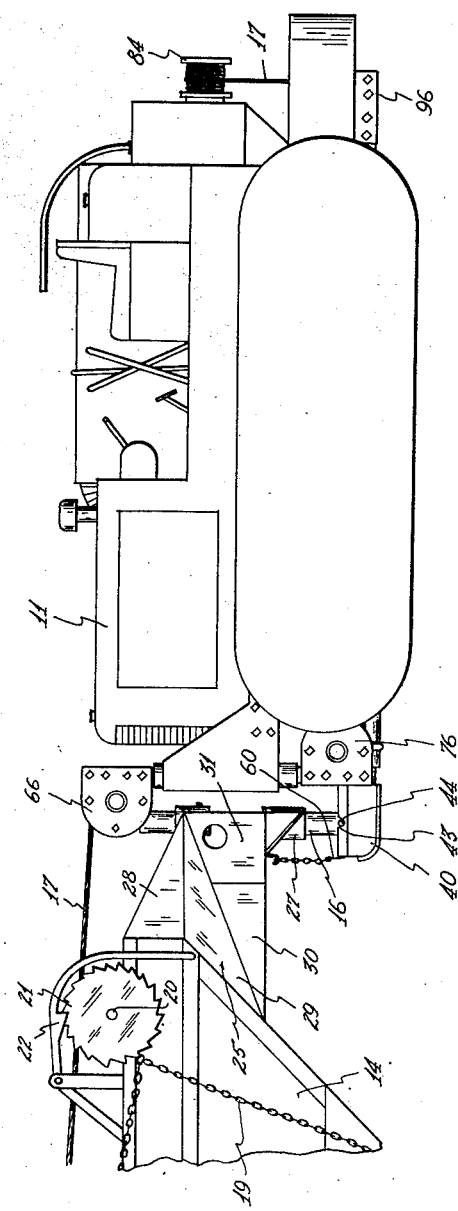
Figure 7:
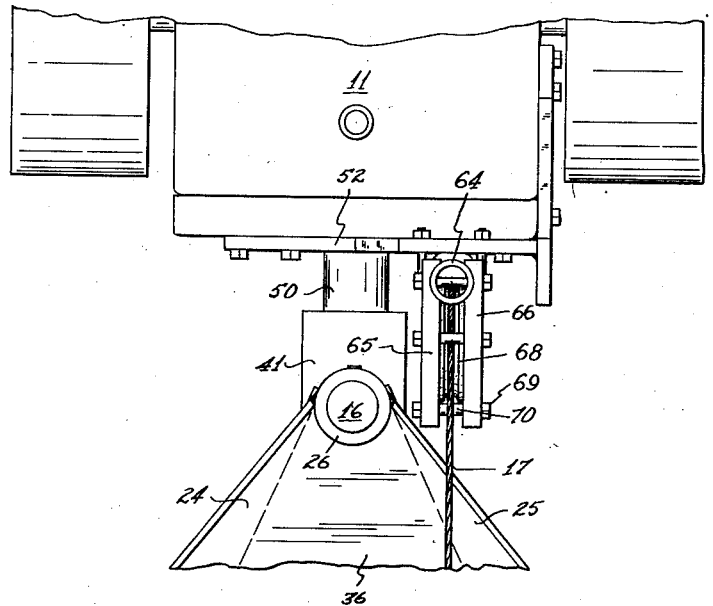
Figure 7 is a top plan view looking down on Figure 6 as indicated by the section line 7—7.
Figure 8:
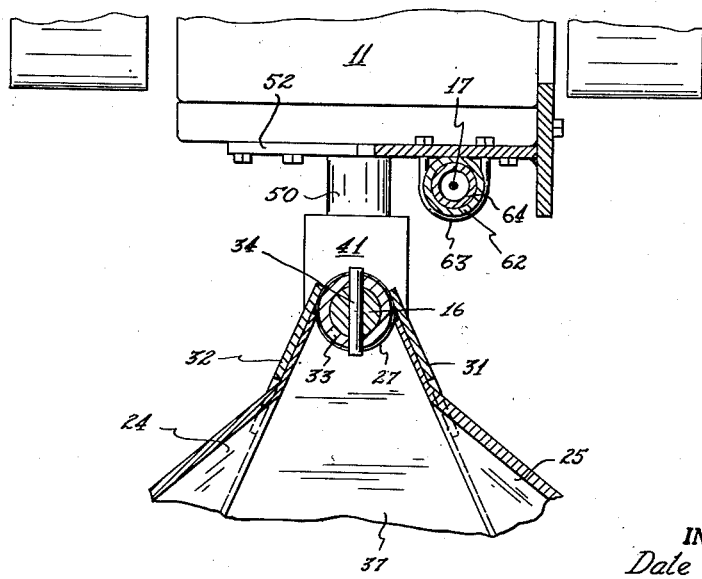
Figure 8 is a sectional view taken on the line 8—8 of Figure 6.

Referring now to the drawings and in particular to Figures 1 and 2, my invention is shown in connection with a self-loading transport or mucking device 10 which is driven by a powered vehicle 11. The transport 10 is shown as of the type covered by my prior Patent No. 2,518,471. In this patent the self-loading transport is provided with a dipper 12 which is pivoted upon a trough 13 at the lower front corner of the trough, the trough in turn being pivoted at its lower rear corner to the body 14 of the transport. The front end of the transport 10 is carried by crawler type supports 15 and the rear end of the transport 10 is supported on a coupling pin 16 that in turn is carried by the vehicle 11.

The dipper 12 is operated as described in my prior patent by a cable 17 which will lift the dipper to empty its load or bite into the trough 13 and lift both the dipper 12 and the trough 13 to dump into the body 14. The body 14 has a dump bottom 18 for emptying. The bottom closure 18 is held closed by chains 19 that wind on a shaft 20. The shaft 20 carries a ratchet wheel 21 which is held against rotation by a hand operated pawl 22. The shaft 20 carries a drum (not shown) for each chain 19 and also carries drums for chains 23 which act to hold the dipper 12 raised whenever the dump closure 18 is lowered. Likewise when the pawl 22 is released to allow the load in the body 14 to drop down and open the bottom closure 18, the chain 19 in unwinding will rotate the shaft 20 to wind up the chains 23 and lift the dipper 12.

The body 14 of the self-loading transport is mounted on the coupling pin 16 by the mechanism shown most clearly by Figures 3, 4, 6, 7 and 8. Two gusset plates 24 and 25 are welded to the rear end of the body 14 and extend rearwardly to the pin 16 where they are welded to an upper collar 26 that is rotatable on the pin 16 and a lower collar 27 that is also rotatable on the pin 16. The gusset plates 24 and 25 are bent to provide upright portions 28 that diverge sharply from the collar 26 to the rear end of the body 14, diagonal portions 29 and lower portions 30 that diverge at a less angle to each other from the pin 16 to the body 14. Reenforcing plates 31 and 32 overlap the gusset plates at their rear ends beneath the diagonal portions 29.

The pin 16 has a sleeve 33 secured thereto by a cotter pin 34 immediately below the collar 26 so as to support the collar 26 and the rear end of the transport 10 at the desired level. There are several apertures 35 in the pin 16 for the cotter pin 34 to provide adjustment of the height at which the rear end of the transport 10 will be supported. As shown in Figure 4, the collar 26 is made up of two sections 26a and 26b that are welded on opposite faces of a top plate 36 that connects the gusset plates 24 and 25. A bottom plate 37 also connects the lower collar 27 to the gusset plates 24 and 25. Additional bracing plates 38 and 39 are used to provide a rigid connection of the collar 27 to the gusset plates 24 and 25.

The coupling pin 16 is supported on a shoe 40 that is a part of the draw-bar assembly carried by the vehicle 11. This shoe comprises a heavy top plate 41 which has an aperture 42 therein receiving the lower end of the coupling pin 16. The top plate 41 also has notches 43 in the sides thereof to seat a cross pin 44 that is secured in the coupling pin 16 nearest its lower end. The aperture 42 is so formed as illustrated in Figure 3 of the drawings that the coupling pin may rock in the aperture in a forward end rearward direction with respect to the plate 41 about the cross pin 44 as a pivot. The shoe 40 is completed by side plates 45 and 46, bottom shoes 47 and 48 and a front plate 49.

The shoe 40 is welded on the front end of a tubular draw-bar 50 which is carried by and attached to the powered vehicle 11. The tubular draw-bar 50 is rotatably mounted in a sleeve 51 which is clamped to mounting brackets 52 and 53 at the ends of the vehicle 11 by U-clamps 54 and 55. At the rear end of the draw-bar 50 a cushion spring 56 is inserted in the sleeve 51. The spring 56 is under compression between the rear end of the draw-bar 50 and a block 57 fixed on the rear end of the sleeve 51. A pulling bolt 58 is keyed to the rear end of the bar 50 and extends through the block 57 where it is provided with a nut 59.

In operation the coupling pin 16 supports the rear end of the transport 10 and is free to rock in a fore and aft direction on the cross pin 44 as an axis. The draw-bar 50 supports the shoe 40 which carries the load that is transmitted by the pin 16. When the transport is pushed forward in loading to shove the dipper 12 into a mass of loose aggregate such as that resulting from the blasting at the face of a mine, the draw-bar 50 can yield endwise against the impact of the dipper because of the cushion spring 57. If the vehicle 11 and the transport 10 are not in parallel horizontal planes transversely of the machine, the draw-bar 50 can rotate so as to maintain the cross pin 44 firmly set in the notches 43 of the plate 41. Thus the necessary universal motion to adapt the coupling to uneven ground contour is provided. When the transport is loaded and is being withdrawn, the draw-bar 50 is in tension and is held in the sleeve 51 by engagement of the nut 59 against the rear end of the sleeve 51. The shoe 40 is connected by a chain 60 and a hook 61 to the bottom plate 37 on the gussets 24 and 25. When it is desired to raise the level of the rear end of the transport 10 on the pin 16, a jack can be placed under the plate 37, and the rear end can be raised to release the load on the collar 33. The pin 34 can then be removed and the collar 33 moved to another one of the apertures 35. The chain 60 also serves to hold down the collars 26 and 27 and to keep the cross pin 44 from bouncing out of the notches of the plate 41.

It will be appreciated that the control of the dipper 12 and the fold back trough 13 by the cable 17 necessitates providing as a part of the coupling mechanism a means for guiding the cable at the point of the coupling. In order to accomplish this, the bracket 52 has a sleeve 62 clamped thereon by U-clamps 63. This sleeve 62 carries a tubular guide 64 for the cable 17. At the upper end of the guide 64 two sheave mounting plates 65 and 66 are mounted. The plates 65 and 66 support a shaft 67 for a sheave 68. The plates are spaced apart and secured to each other by bolts 69 and spacing sleeves 70. The upper portion of the tube 64 is cut out as indicated at 71 so that a portion of the sheave 68 extends into the tube 64 and the cable 17 is centered with respect to the tube 64 where it enters the tube. The tube 64 is supported on a bearing 72 which is located about midway between the top and bottom ends of the sleeve 62. A second tube 73 extends upwardly into the sleeve 62 from the lower end and is held in the sleeve 62 by set screws 74. (See Figure 4.) On the lower end of the tube 73 two sheave guide plates 75 and 76 are secured. These plates mount a shaft 77 for a sheave 78. The tube 73 is cut away at 79 to admit a portion of the sheave 78 so as to center the cable 17 in the lower tube 73 at the point where the cable 17 engages the sheave 78. Bolts 80 and spacers 81 are used to secure the sheave guides 75 and 76 to each other and to the tube 73.

At the rear end of the vehicle 11, the bracket 53 and the sleeve 51 provide a support for a guide tube 82 for the cable 17 and a sheave 83 around which the cable extends to a winch 84 on the rear end of the vehicle 11. Two spacer plates 85 and 86 are provided with apertures at one end to receive the sleeve 51 and are clamped to the sleeve 51 by set screws 87 and 88. The plates 85 and 86 at their other ends are apertured to receive a sleeve 89. The plate 85 and the sleeve 89 are fastened together by bolts 90 which extend through the plate 85 and the sleeve 89 to a guide ring 91 which guides the cable into the tube 82. A thrust bearing 92 is provided between the ring 91 and the tube 82. The tube 82 is cut away at 93 to receive the sheave 83. This sheave 83 is mounted on a shaft 94 that is carried between two sheave guides 95 and 96 that are secured on the tube 82 and in spaced relation to each other by bolts 97 and spacers 98.

The tube 82 and its mounting in the sleeve 89 pivotally mount the sheave 83 so that it can swing and keep the cable 17 in proper position to wind on the winch 84. The sheave 78 is aligned with the tube 82 and the ring 91 so as to guide the cable 17 into the tube 73. The tube 64 is pivoted on the top of the tube 73 in the sleeve 62 so that the upper sheave 68 can rotate with the sleeve 64 to keep the cable 17 aligned with the transport 10, regardless of the angle the transport may make with the longitudinal axis of the vehicle 11.

It is believed that the nature and advantages of my improved coupling mechanism will be apparent from the foregoing description.

Having thus described my invention, I claim:

1. A coupling mechanism adapted for connecting a powered vehicle to a work performing vehicle such as a self-loading transport which is moved about by the powered vehicle and controlled in its operations from the powered vehicle, said mechanism comprising a draw-bar pivotally mounted on the powered vehicle for rotation about an axis extending longitudinally of the powered vehicle, means connecting the draw-bar to the powered vehicle to transmit endwise push or pull on the draw-bar to the powered vehicle, a shoe on the draw-bar, an upright coupling pin pivotally supported on said shoe to rock toward and away from the powered vehicle, and vertically elongated bearing means fixed on the work performing vehicle, the pin extending through said bearing means and being rotatable therein.

2. A coupling mechanism adapted for connecting a powered vehicle to a work performing vehicle such as a self-loading transport which is moved about by the powered vehicle and controlled in its operations from the powered vehicle, said mechanism comprising a draw-bar pivotally mounted on the powered vehicle for rotation about an axis extending longitudinally of the powered vehicle, a sleeve in which the draw-bar is rotatably and slidably mounted, a spring in the sleeve urging the draw-bar toward the work performing vehicle, stop members on the sleeve and draw-bar limiting the endwise movement of the draw-bar by said spring, brackets mounting the sleeve on the powered vehicle, a shoe on the draw-bar, an upright coupling pin pivotally supported on said shoe to rock toward and away from the powered vehicle, and vertically elongated bearing means fixed on the work performing vehicle, the pin extending through said bearing means and being rotatable therein.

3. A coupling mechanism adapted for connecting a powered vehicle to a work performing vehicle such as a self-loading transport which is moved about by the powered vehicle and controlled in its operations from the powered vehicle, said mechanism comprising a mounting sleeve extending lengthwise of the powered vehicle, front and rear brackets fixed to said sleeve and having means to secure them on the powered vehicle, a draw-bar pivotally supported in said sleeve, a shoe on said draw-bar, an upright coupling pin seated in said shoe to rock toward and away from the powered vehicle, the work performing vehicle having a rear supporting frame rotatable on the coupling pin.

4. A coupling mechanism for coupling a self-loading transport to a powered vehicle comprising a draw-bar mounted on the powered vehicle for rotation and extending parallel to the longitudinal axis of the vehicle, said draw-bar having a coupling shoe secured at one end thereof, said shoe having a coupling pin aperture therein and notches extending transversely with respect to the draw-bar at the sides of said aperture, a coupling pin having its lower end in said aperture and having a cross pin seated in said notches and connecting the coupling pin to said shoe so that the coupling pin can rock toward and away from the powered vehicle, and a transport support pivoted on said pin.

5. A coupling mechanism for coupling a self-loading transport to a powered vehicle comprising a draw-bar mounted on the powered vehicle for rotation and extending parallel to the longitudinal axis of the vehicle, said draw-bar having a coupling shoe secured at one end thereof, said shoe having a coupling pin aperture therein and notches extending transversely with respect to the draw-bar at the sides of said aperture, a coupling pin having its lower end in said aperture and having a cross pin seated in said notches and connecting the coupling pin to said shoe so that the coupling pin can rock toward and away from the powered vehicle, upper and lower collars fixed to the transport and rotatably mounted on the coupling pin, and a supporting sleeve fixed to the coupling pin between said collars.

6. A coupling mechanism adapted for connecting a powered vehicle to a self-loading transport which is moved about and controlled in its operations from the powered vehicle, said mechanism comprising a front bracket having means for attachment to the front end of the powered vehicle, a rear bracket having means for attachment to the rear end of the powered vehicle, a sleeve fixed to said brackets, a draw-bar rotatably mounted in said sleeve, a shoe on said draw-bar in front of the front bracket, and an upright coupling pin pivotally supported on said shoe to rock toward and away from the powered vehicle, and vertically elongated bearing means on the self-loading transport through which the coupling pin extends and in which the coupling pin is rotatable.

7. A coupling mechanism for coupling a powered vehicle to a work performing vehicle such as a self loading transport comprising a draw bar, a support for said draw bar mounting the draw bar for turning movement about its own longitudinal axis, said support including means for connecting the draw bar to the powered vehicle to transmit endwise push or pull on the draw bar to the powered vehicle, a rear supporting frame on the work performing vehicle, an upright coupling pin supporting the frame for rotation about the pin axis, the draw bar having a shoe into which the pin extends, the shoe and pin having pivot means supporting the pin on the shoe for rocking movement toward and away from the powered vehicle.

8. A coupling mechanism adapted for connecting a powered vehicle to a work performing vehicle such as a self-loading transport which is moved about by the powered vehicle, said mechanism comprising a sleeve, mounting brackets carrying the sleeve, a draw bar rotatably mounted in the sleeve, and having limited endwise movement in the sleeve, one end of said draw bar projecting from one end of the sleeve, resilient means in the sleeve urging the draw bar toward the last named end of the sleeve, and a coupling pin having its lower end seated on the projecting end of the draw bar and extending upwardly therefrom to provide a pivotal mounting for the work performing vehicle, said pin being pivoted on the draw bar end on an axis at right angles to the draw bar axis.

References Cited in the file of this patent
UNITED STATES PATENTS

| | | |
|---|---|---|
| 1,045,720 | Mayer | Nov. 26, 1912 |
| 1,610,902 | Tomlinson | Dec. 14, 1926 |
| 1,632,070 | Hawkins | June 14, 1927 |
| 2,002,604 | Johnson | May 28, 1935 |
| 2,642,293 | Simmons | June 16, 1953 |
| 2,646,287 | Kytola | July 21, 1953 |